United States Patent [19]

Janky

[11] Patent Number: 6,046,687
[45] Date of Patent: *Apr. 4, 2000

[54] CLANDSETINE LOCATION REPORTING FOR MISSING VEHICLES

[75] Inventor: James M. Janky, Los Altos, Calif.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/814,195

[22] Filed: Mar. 10, 1997

Related U.S. Application Data

[63] Continuation of application No. 08/443,235, May 17, 1995, Pat. No. 5,629,693, which is a continuation-in-part of application No. 08/157,726, Nov. 24, 1993, abandoned.

[51] Int. Cl.[7] .................................................... G08G 1/123
[52] U.S. Cl. .......................... 340/988; 180/287; 340/426; 342/457; 455/422
[58] Field of Search ..................................... 340/426, 988, 340/989, 539, 990; 342/357, 457; 180/287; 307/10.2; 455/422

[56] References Cited

U.S. PATENT DOCUMENTS

| 3,439,320 | 4/1969 | Ward . |
| 3,568,116 | 3/1971 | Sole ........................................ 355/216 |
| 3,568,161 | 3/1971 | Knickel . |

(List continued on next page.)

FOREIGN PATENT DOCUMENTS

| 242099 | 10/1987 | European Pat. Off. .......... G01S 5/14 |
| 278069 | 8/1988 | European Pat. Off. .......... H01Q 9/04 |
| 358308 | 3/1990 | European Pat. Off. .......... H01Q 1/32 |
| 9113534 | 2/1992 | Germany ....................... B60R 25/10 |
| 3140302 | 5/1991 | Japan ............................... H01Q 1/32 |
| 2216319 | 10/1989 | United Kingdom ..................... 379/61 |
| WO 9305490 | 3/1993 | WIPO ............................ G08B 25/01 |

OTHER PUBLICATIONS

Siuru "On–Board Navigation Systems for your Car", Popular Electronics, Jan., 1993.
Peters "Ford Debuts Factory–Installed Cellular Phone", The Washington Times, Jul. 22, 1994.

(List continued on next page.)

*Primary Examiner*—Brent A. Swarthout
*Attorney, Agent, or Firm*—Donald S. Dowden; Cooper & Dunham LLP

[57] ABSTRACT

Apparatus and method for a location determination and reporting (LDR) system for clandestinely or surreptitiously determining and reporting a missing vehicle present location. The vehicle may be stationary or moving and may be anywhere within reach of a cellular central station to which the location is reported. The vehicle is equipped with a location determination (LD) unit (preferably hidden on the vehicle) that receives LD signals and determines the LD unit present location, a specially configured cellular telephone, and a call interceptor. When the vehicle is reported missing, a central station or the vehicle operator interrogates the vehicle LDR system by transmitting a location interrogation signal, commanding the LD unit to transmit its present location. The vehicle phone does not signal receipt of an incoming call for an initial time period of selected length $\Delta t_d$, awaiting possible receipt of a location interrogation signal. If the incoming call includes a location interrogation signal, the cellular phone does not "ring" but transmits information on the LD unit present location to a specified recipient. If the incoming call does not include a location interrogation signal, the cellular phone "rings" audibly or visually, after the initial time delay, and simulates behavior as a normal cellular phone for that call. The cellular phone simulates normal operation if a vehicle occupant attempts to use the phone. An unauthorized user of the vehicle receives no indication that the innocuous cellular phone is used to track the vehicle present location.

14 Claims, 4 Drawing Sheets

U.S. PATENT DOCUMENTS

| | | | |
|---|---|---|---|
| 3,599,200 | 8/1971 | Bunting . | |
| 3,623,108 | 11/1971 | DuBois et al. | 343/712 |
| 3,665,086 | 5/1972 | Magee et al. | 35/10.2 |
| 3,828,306 | 8/1974 | Angeloni . | |
| 3,886,554 | 5/1975 | Braun et al. | 343/112 R |
| 3,961,166 | 6/1976 | Stobart | 235/150.27 |
| 4,009,375 | 2/1977 | White et al. | 235/150.24 |
| 4,083,003 | 4/1978 | Haemmig | 325/6 |
| 4,112,421 | 9/1978 | Freeny, Jr. | 343/112 D |
| 4,177,466 | 12/1979 | Reagan | 343/112 TC |
| 4,197,655 | 4/1980 | Moore | 33/318 |
| 4,217,588 | 8/1980 | Freeny, Jr. | 343/112 D |
| 4,248,069 | 2/1981 | Burbank | 70/160 |
| 4,370,658 | 1/1983 | Hill | 343/713 |
| 4,370,815 | 2/1983 | Younkin | 33/318 |
| 4,384,409 | 5/1983 | Lao | 33/318 |
| 4,399,330 | 8/1983 | Kuenzel | 179/2 EB |
| 4,416,066 | 11/1983 | Romacker | 33/318 |
| 4,426,712 | 1/1984 | Gorski-Popiel | 375/96 |
| 4,445,118 | 4/1984 | Taylor et al. | 342/357 |
| 4,459,667 | 7/1984 | Takeuchi | 364/424 |
| 4,463,357 | 7/1984 | MacDoran | 343/460 |
| 4,470,119 | 9/1984 | Hasebe et al. | 364/449 |
| 4,515,994 | 5/1985 | Bolle et al. | 179/2 R |
| 4,584,709 | 4/1986 | Kneisel et al. | 455/78 |
| 4,651,157 | 3/1987 | Gray et al. | 342/457 |
| 4,688,244 | 8/1987 | Hannon et al. | 377/58 |
| 4,689,626 | 8/1987 | Hori et al. | 342/357 |
| 4,701,760 | 10/1987 | Raoux | 340/993 |
| 4,706,689 | 11/1987 | Man | 128/903 |
| 4,717,904 | 1/1988 | Murakami . | |
| 4,718,080 | 1/1988 | Serrano et al. | 379/59 |
| 4,723,218 | 2/1988 | Hasebe et al. | 364/449 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |
| 4,743,913 | 5/1988 | Takai | 342/457 |
| 4,750,197 | 6/1988 | Denekamp et al. | 379/58 |
| 4,751,512 | 6/1988 | Longaker | 342/357 |
| 4,751,514 | 6/1988 | Sheriff | 343/717 |
| 4,754,465 | 6/1988 | Trimble | 375/1 |
| 4,758,166 | 7/1988 | Bonnett et al. | 343/712 |
| 4,760,402 | 7/1988 | Mizuno et al. | 343/713 |
| 4,788,550 | 11/1988 | Chadima, Jr. | 343/712 |
| 4,791,572 | 12/1988 | Green, III et al. | 364/449 |
| 4,797,671 | 1/1989 | Toal, Jr. | 340/825.49 |
| 4,809,005 | 2/1989 | Counselman, III | 342/352 |
| 4,819,053 | 4/1989 | Halavais | 342/353 |
| 4,819,174 | 4/1989 | Furuno et al. | 364/444 |
| 4,835,541 | 5/1989 | Johnson et al. | 343/713 |
| 4,837,700 | 6/1989 | Ando et al. | 364/449 |
| 4,866,453 | 9/1989 | Nagy et al. | 343/712 |
| 4,873,530 | 10/1989 | Takeuchi et al. | 343/711 |
| 4,891,650 | 1/1990 | Sheffer | 342/457 |
| 4,897,642 | 1/1990 | DiLullo et al. | 340/825.06 |
| 4,897,643 | 1/1990 | Shibata et al. | 340/825.69 |
| 4,897,661 | 1/1990 | Hiraiwa et al. | 342/457 |
| 4,897,792 | 1/1990 | Hosoi | 364/449 |
| 4,907,290 | 3/1990 | Crompton | 455/56 |
| 4,908,629 | 3/1990 | Apsell et al. | 342/457 |
| 4,910,493 | 3/1990 | Chambers et al. | 340/426 |
| 4,910,494 | 3/1990 | Tamai | 340/438 |
| 4,912,756 | 3/1990 | Hop | 379/60 |
| 4,924,402 | 5/1990 | Ando et al. | 364/449 |
| 4,924,699 | 5/1990 | Kuroda et al. | 78/178 R |
| 4,939,522 | 7/1990 | Newstead et al. | 342/387 |
| 4,943,803 | 7/1990 | Vrijkorte | 340/825.49 |
| 4,947,151 | 8/1990 | Rosenberger | 340/426 |
| 4,949,089 | 8/1990 | Ruszkowski, Jr. | 342/52 |
| 4,949,268 | 8/1990 | Nishikawa et al. | 364/449 |
| 4,951,212 | 8/1990 | Kurihara et al. | 364/449 |
| 4,965,821 | 10/1990 | Bishop et al. | 379/91 |
| 4,982,070 | 1/1991 | Bezin et al. | 235/378 |
| 4,983,980 | 1/1991 | Ando | 342/357 |
| 4,987,420 | 1/1991 | Inamiya | 342/457 |
| 4,987,422 | 1/1991 | Ryan | 343/713 |
| 5,003,317 | 3/1991 | Gray et al. | 342/457 |
| 5,005,020 | 4/1991 | Ogawa et al. | 343/713 |
| 5,014,206 | 5/1991 | Scribner et al. | 364/449 |
| 5,021,794 | 6/1991 | Lawrence | 342/457 |
| 5,021,961 | 6/1991 | Ross et al. | 364/443 |
| 5,023,900 | 6/1991 | Tayloe et al. | 379/32 |
| 5,043,736 | 8/1991 | Darnell et al. | 342/357 |
| 5,045,861 | 9/1991 | Duffett-Smith | 342/457 |
| 5,055,851 | 10/1991 | Sheffer | 342/457 |
| 5,060,162 | 10/1991 | Ueyama et al. | 364/449 |
| 5,068,656 | 11/1991 | Sutherland | 340/989 |
| 5,084,822 | 1/1992 | Hayami | 364/449 |
| 5,087,919 | 2/1992 | Odagawa et al. | 342/357 |
| 5,093,669 | 3/1992 | Kajiyama | 342/457 |
| 5,095,500 | 3/1992 | Tayloe et al. | 379/32 |
| 5,101,356 | 3/1992 | Timothy et al. | 364/449 |
| 5,101,357 | 3/1992 | Tempelhof | 364/449 |
| 5,111,207 | 5/1992 | Allen | 342/20 |
| 5,119,101 | 6/1992 | Barnard | 342/357 |
| 5,119,102 | 6/1992 | Barnard | 342/357 |
| 5,119,504 | 6/1992 | Durboraw, III | 455/54.1 |
| 5,126,941 | 6/1992 | Gurmu et al. | 364/424.02 |
| 5,129,605 | 7/1992 | Burns et al. | 246/5 |
| 5,134,392 | 7/1992 | Takeuchi et al. | 340/825.69 |
| 5,177,494 | 1/1993 | Dorrie et al. | 343/711 |
| 5,177,685 | 1/1993 | Davis et al. | 364/443 |
| 5,187,810 | 2/1993 | Yoneyama et al. | 455/34.1 |
| 5,202,913 | 4/1993 | Lang et al. | 379/58 |
| 5,208,756 | 5/1993 | Song | 364/449 |
| 5,218,367 | 6/1993 | Sheffer | 342/457 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,276,728 | 1/1994 | Pagliaroli et al. | 340/426 |
| 5,315,303 | 5/1994 | Tsou et al. | 342/27 |
| 5,334,974 | 8/1994 | Simms et al. | 340/426 |
| 5,341,434 | 8/1994 | Kawamoto | 381/86 |
| 5,355,142 | 10/1994 | Marshall et al. | 343/700 MS |
| 5,365,516 | 11/1994 | Jandrell | 370/18 |
| 5,402,134 | 3/1995 | Miller et al. | 343/742 |
| 5,418,537 | 5/1995 | Bird | 342/357 |
| 5,428,830 | 6/1995 | Zerod et al. | 455/282 |
| 5,448,456 | 9/1995 | Huynh | 362/80 |
| 5,490,704 | 2/1996 | Calnan | 296/24.1 |
| 5,504,478 | 4/1996 | Knapp | 340/825.69 |
| 5,513,244 | 4/1996 | Joao et al. | 379/58 |
| 5,515,043 | 5/1996 | Berard et al. | 340/426 |
| 5,532,709 | 7/1996 | Talty | 343/819 |
| 5,544,225 | 8/1996 | Kennedy, III et al. | 379/59 |
| 5,550,551 | 8/1996 | Alesio | 342/457 |
| 5,557,254 | 9/1996 | Johnson et al. | 340/426 |
| 5,576,716 | 11/1996 | Sadler | 342/457 |
| 5,610,620 | 3/1997 | Stites et al. | 343/725 |
| 5,629,693 | 5/1997 | Janky | 340/988 |
| 5,649,316 | 7/1997 | Prudhomme | 455/345 |
| 5,649,317 | 7/1997 | Suzuki | 455/345 |
| 5,673,305 | 9/1997 | Ross | 340/426 |

OTHER PUBLICATIONS

PR Newswire, "Global Positioning Satellite (GPS) and Technology and the Cellular Phone Network", Apr. 18, 1995.

DS Parasnis, Magetism, Harper & Bros., New York, 1961, pp. 91–121.

David Wells, Guide to GPS Positioning, Canadian GPS Associates, 1986.

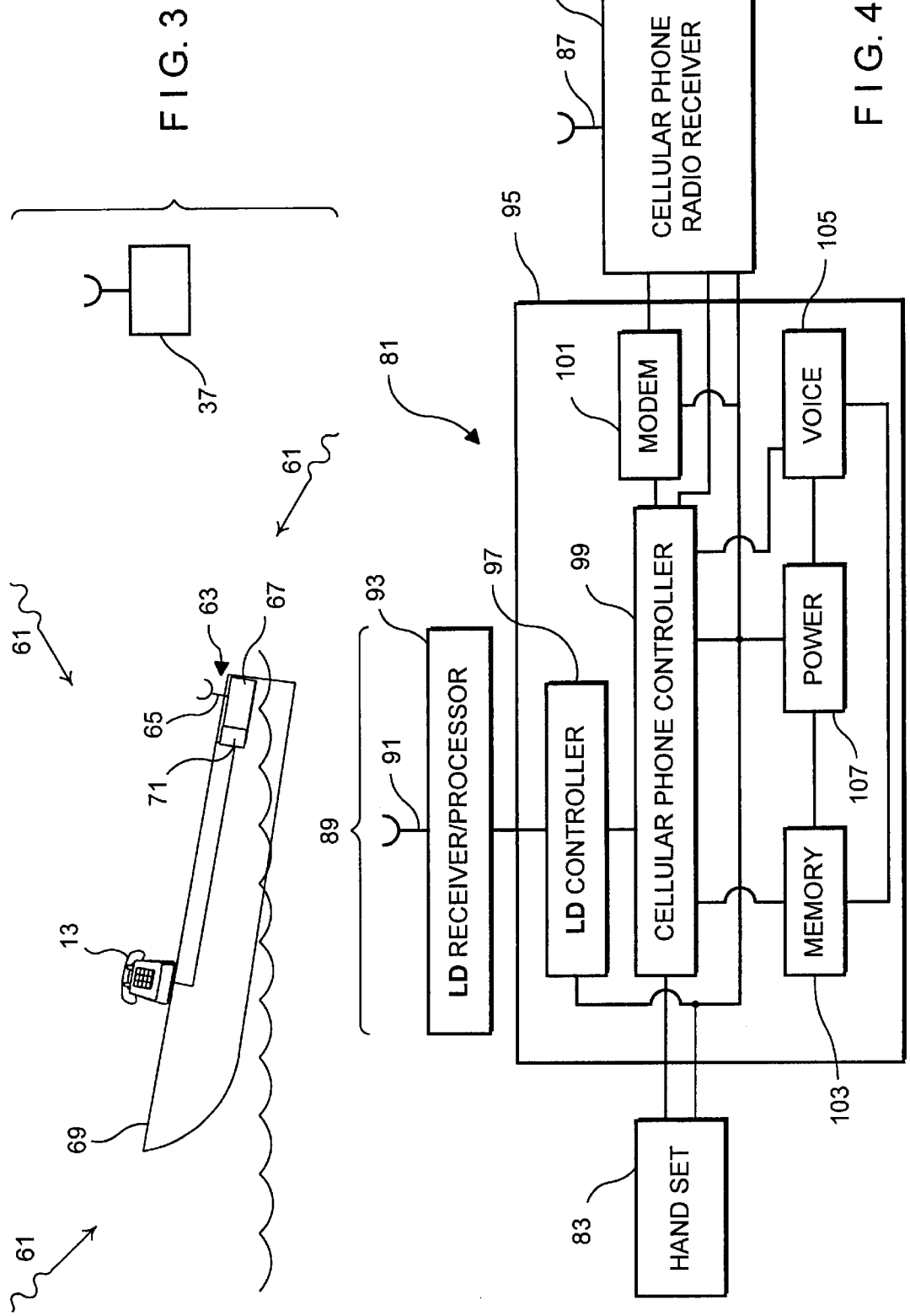

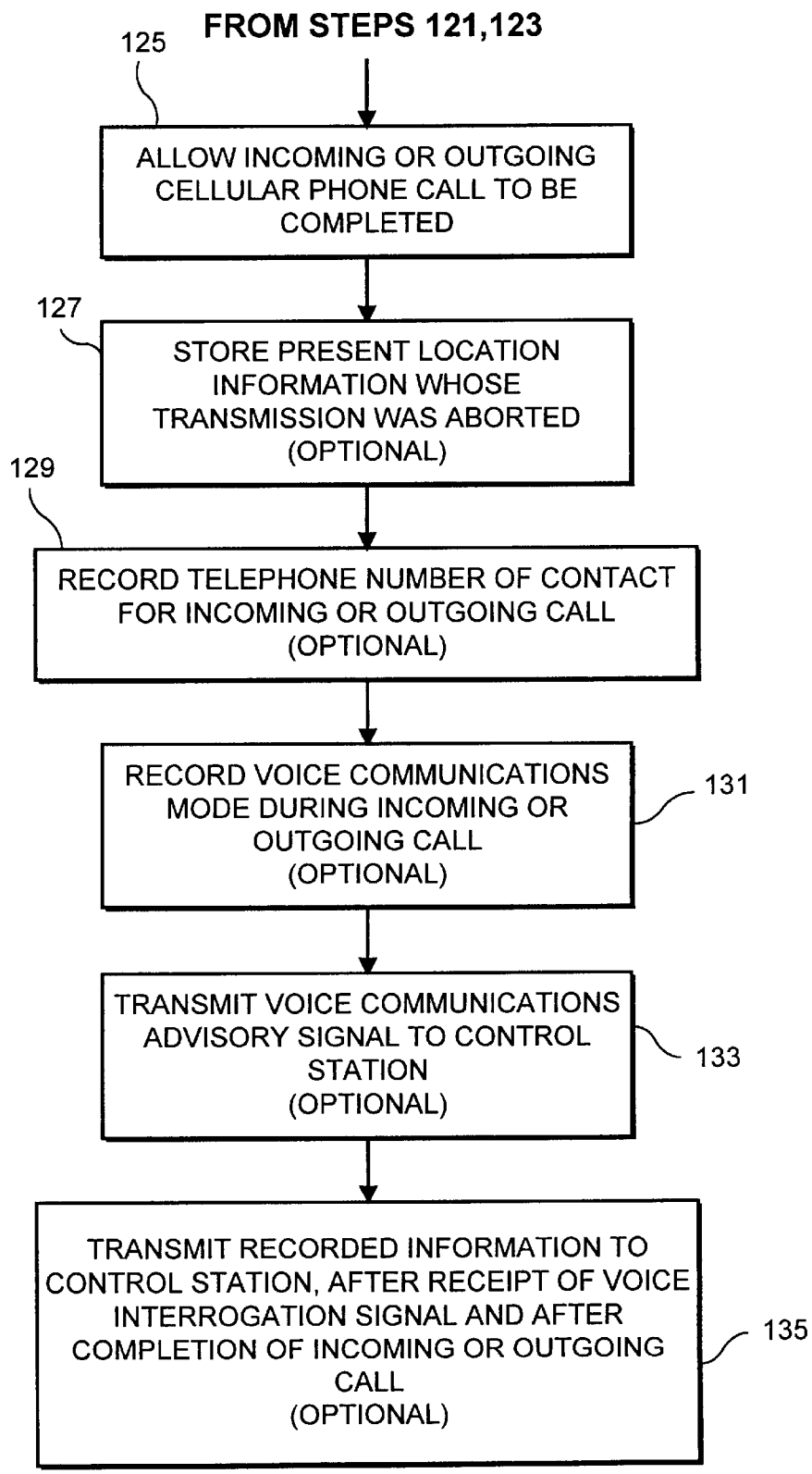
F I G. 5B

6,046,687

CLANDSETINE LOCATION REPORTING FOR MISSING VEHICLES

CROSS REFERENCE TO RELATED APPLICATIONS

This is a continuation under 35 U.S.C. §120 of U.S. application of Janky Ser. No. 08/443,235, filed May 17, 1995, now U.S. Pat. No. 5,629,693, which is a continuation-in-part under 35 U.S.C. §120 of abandoned U.S. application Ser. No. 08/157,726, filed Nov. 24, 1993.

FIELD OF THE INVENTION

This invention relates to clandestine use of location determination systems, such as the Global Positioning System, to monitor and report on the location of a missing vehicle.

BACKGROUND OF THE INVENTION

As used herein, the term "vehicle" refers to land vehicles and to marine vehicles or vessels. In the United States, about 1.7 million automotive vehicles and as many as 100,000 marine and aircraft vehicles are reported missing (or stolen) each year. The probability that a land or marine vehicle will be recovered drops dramatically after the vehicle or vessel has been missing for 24 hours or more. Thus, time is of the essence in locating and retrieving a missing vehicle. Several workers in this field have used relative signal strength, signal triangulation and/or pluralities of radiowave to determine the location of a vehicle and have used a cellular phone system to transmit relevant information to a base station for analysis. The cellular phone unit used for such signal transmissions is usually dedicated to this task and is not available for other activities.

Sheffer, in U.S. Pat. No. 4,891,650, discloses a vehicle location system that disperses an array of cellular monitoring stations, each of which detects a cellular alarm signal that is transmitted from a vehicle when the vehicle is determined to be missing. Vehicle location is determined at a base station by the relative alarm strength measured at each detector.

U.S. Pat. No. 5,043,736, issued to Darnell et al, discloses a portable vehicle locating system that uses a Global Positioning System (GPS) to determine vehicle location, a cellular phone to report this location to a base station, and an interface to convert GPS signals to cellular phone signals for transmission.

A position-aided subscriber unit for a satellite-based cellular phone system is disclosed by Durboraw in U.S. Pat. No. 5,119,341. A GPS unit determines the location of a transceiver on the ground and transmits This location information to a satellite, to increase the efficiency of satellite-to-receiver communication. This apparatus has use in asset management and in search-and-rescue operations.

Wortham, in U.S. Pat. Nos. 5,155,689 and 5,398,190, discloses installation of a mobile cellular phone unit, with its own identification number, an unspecified location determination unit, and an interface between these two units within a vehicle, to determine and transmit vehicle location. This vehicle location information is displayed on a screen in the vehicle and is periodically transmitted to a base station that is located elsewhere.

In U.S. Pat. No. 5,187,805, Bertiger et al disclose a telemetry, tracking and control (TT&C) system for satellite-aided cellular communications. Here, the cells for the cellular phone system move with the satellite used for the link. GPS-determined location of a mobile user station is used to facilitate handoff from one satellite to another as a satellite cell pattern sweeps across a region containing one or several users.

Song discloses a vehicle locating and navigating system in U.S. Pat. No. 5,208,756. A small receiver, hidden on the vehicle, is activated by a plurality of DTMF signals transmitted from telephone stations with fixed, known locations. The vehicle receiver determines the present location of the vehicle, using relative or absolute signal strengths of the received signals and triangulation of these signals. The vehicle location information is then transmitted to a base station, using a voice synthesis and/or digital signals.

A vehicle tracking system that uses an array of spaced apart cellular phone receivers is disclosed in U.S. Pat. No. 5,218,367, issued to Sheffer et al. One or more sensors, such as vehicle break-in sensors, is positioned on a vehicle, and a cellular phone transmitter on the vehicle transmits a cellular signal when a corresponding sensor is activated. The vehicle's location is determined at a base station, using relative signal strengths of these signals, as received at several spaced apart receivers.

U.S. Pat. No. 5,223,844, issued to Mansell, discloses a vehicle tracking and security system that provides vehicle location information where vehicle break-in, theft, breakdown or other unusual events or emergencies occur. Several "mobile units," each including some type of event sensor, are hidden on the vehicle. When a sensor senses occurrence of an alarm condition or event, a mobile unit causes an on-board transmitter to transmit an event alarm or signal to a control center, together with the location of the vehicle as determined by an on-board GPS receiver. The control center then takes appropriate action, depending on the condition or event and the location of the vehicle.

Dennison discloses a cellular phone system that uses GPS-determined location of a vehicle in which the phone unit is carried to make call management decisions, such as call handoff, in U.S. Pat. No. 5,235,633. The vehicle location information is transmitted to a call management site that determines when cell handoff will occur for a given mobile cellular phone unit.

What is needed is a system including cellular telecommunication means that allows determination and reporting of the present location of a missing vehicle, using clandestine means on the vehicle itself. Preferably, the cellular means (1) will function in a normal manner if used by a vehicle occupant while the vehicle is missing and (2) can be used to determine and transmit a report on the present location of the missing, if commanded to do so by a central station that communicates with the vehicle. Preferably, the system should allow recording of any telecommunications made using the cellular means while the vehicle is missing.

SUMMARY OF THE INVENTION

These needs are met by the invention, which provides a location determination and reporting (LDR) system for clandestinely determining and reporting on the present location of a missing vehicle. The vehicle may be in motion or may be motionless when its location is determined and reported, and the vehicle may be anywhere within reach of a cellular station to which the location is reported.

A vehicle is equipped with an operating cellular telephone, with a location determination (LD) unit, including an LD signal antenna and receiver/processor (preferably hidden on the vehicle), that determines the present location of the LD antenna, and with a cellular telephone/LD unit controller and interface. If (or when) the vehicle is reported missing, stolen or moved without authorization from its last known resting place, a central station uses the cellular telephone facility to interrogate the vehicle to determine the present location of the vehicle, even if the vehicle is presently in motion. The owner, agent or other interested person makes a phone call to the cellular phone unit in the vehicle and transmits a location interrogation message that commands the LD signal receiver/processor to provide information on the present location of the LD antenna for transmission by the vehicle cellular phone unit to a designated central station where the owner, tracking agent or police are waiting. When the vehicle cellular phone is contacted and the clandestine vehicle tracking mode is activated, the phone will not signal an incoming call for an initial time period of length $\Delta t_d$ ($\Delta t_d$=1–30 sec, preferably $\Delta t_d$=1–5 sec), awaiting receipt of an anticipated location interrogation signal from the central station requesting that the cellular phone unit provide present location information for the vehicle. If the cellular phone receives this location interrogation signal while the clandestine tracking mode is activated, the cellular phone does not "ring" in the usual sense, provides no indication that it is communicating with the designated station, and transmits information on the vehicle's present location to the central station.

However, if the anticipated location interrogation signal is not received, the cellular phone will then "ring" audibly or otherwise signal visually, after a time delay of $\Delta t_d$, and behave as a normal cellular phone for the remainder of that phone call. When the system is in a clandestine tracking mode, the controller and cellular phone in the vehicle answer any incoming phone call with a simulated ringing, to avoid alerting any caller to the unusual nature of this phone system. If the incoming call is not a location interrogation signal, the cellular phone handset receives a standard audible ringing tone, and a vehicle occupant can respond to the incoming phone in a normal manner. If the incoming phone call is not answered, the controller and cellular phone will continue to transmit the sounds of simulated ringing or actual ringing for the benefit of the caller, until the caller disconnects.

The cellular phone will also function normally if a person in the vehicle attempts to use the phone. This activity will temporarily pre-empt use of the cellular phone to respond to a location interrogation signal. Thus, an unauthorized user of the vehicle receives no warning or indication that the innocuous cellular phone in the vehicle is being used, or can be used, to track the present location of the vehicle. If one or more phone calls is received by or made from the vehicle while the vehicle is missing, the cellular phone unit and controller can record the telephone number of the calling or called person and/or the voice communication itself during this period, and can transmit this recorded information upon receipt from the central station of a voice communication interrogation signal.

BRIEF DESCRIPTION OF THE DRAWINGS

FIG. 3 is a schematic view illustrating use of another embodiment of the invention for a marine vessel.

FIG. 4 is a schematic view of an embodiment of apparatus that may be installed in a vehicle for determining and reporting on the present location of the vehicle.

FIGS. 5A and 5B are a flow chart illustrating a procedure followed by an LDR unit according to an embodiment of the invention.

DESCRIPTION OF BEST MODE OF THE INVENTION

Figure 1:
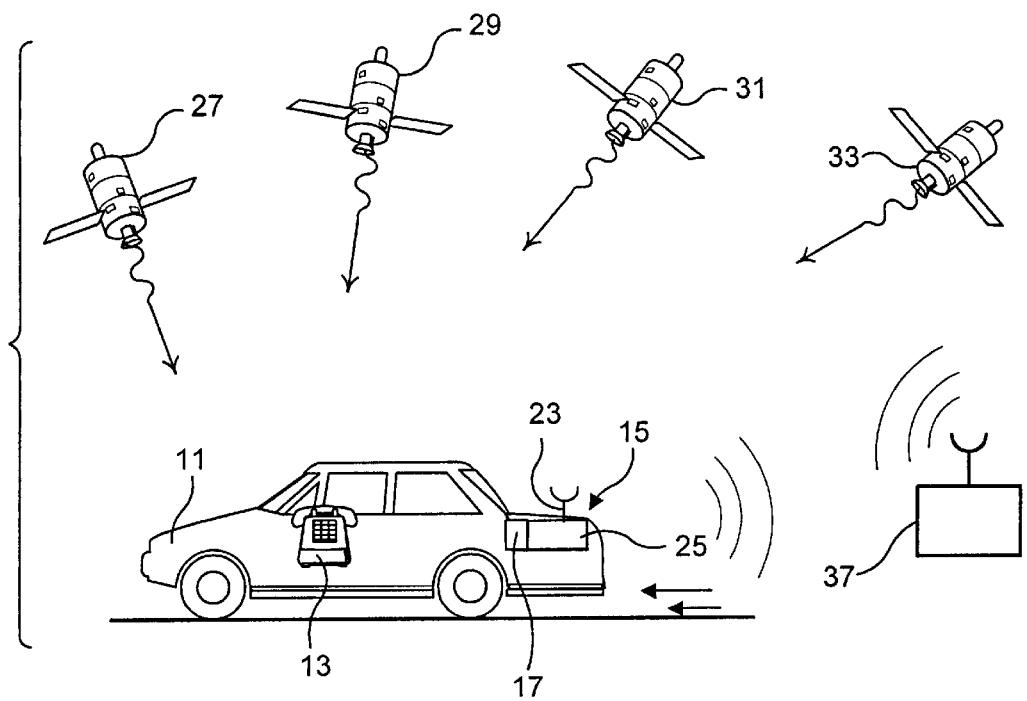
FIG. 1 is a schematic view illustrating use of one embodiment of the invention for determining the location of a land vehicle, using a satellite-based LD system, such as the Global Positioning System.

FIG. 1 illustrates use of the invention to monitor and report on the location of a land vehicle 11, using a satellite-based LD system. A cellular telephone unit 13, LD unit 15 and cellular phone/LD unit controller 17 are installed in the vehicle 11. The cellular phone unit 13 is placed in plain sight of, and within the reach of, an operator of the vehicle 11, as a normal cellular phone would be. The cellular phone 13 is connected to a power supply 19 and operates as a normal cellular phone for most purposes. The LD unit 15, preferably hidden from view on the vehicle 11, has an LD signal antenna 23 and associated LD signal receiver/processor 25 that receive LD signals from three or more LD system satellites 27, 29, 31, 33 and determine the present location of the LD antenna, either continuously or periodically or upon demand. The cellular phone unit 13, LD unit 15 and controller 17 (also preferably hidden from view on the vehicle) together form a location determination and reporting (LDR) unit that may be used to practice the invention in one embodiment.

The LD unit 15 is connected to the cellular phone unit 13 through the controller unit 17 that (1) receives cellular phone messages through the cellular phone and (2) delays audible or visual signalling of an incoming call to a vehicle occupant by the cellular phone for a period of time $\Delta t_d$, ($\Delta t_d$=1–30 sec, preferably $\Delta t_d$=1–5 sec) to determine whether the cellular phone message is a normal message or is a location interrogation signal. However, the controller unit 17 and cellular phone unit 15 produce a simulated ringing for the benefit of the caller on an incoming call, to avoid alerting this caller to the primary purpose of the cellular phone. If the incoming call is not a location interrogation signal, after the time-out interval of length $\Delta t_d$ the cellular phone handset receives a standard audible ringing tone, and a vehicle occupant can respond to the incoming phone in a normal manner. If the incoming phone call is not answered, the controller and cellular phone will continue to transmit the sounds of simulated ringing or actual ringing for the benefit of the caller, until the caller disconnects.

If the cellular phone message is a normal message, the controller 17 (3A) allows the cellular phone unit 13 to ring and to function normally. If an occupant in the vehicle 11 answers the cellular phone 13 as a result of receipt of an incoming call signal, the cellular phone would behave normally. If a person in the vehicle 11 uses the cellular phone 13 to place an outgoing phone call, the cellular phone would also behave normally. However, if the signal received on the cellular phone 13 is a location interrogation signal from the central station, the controller 17 will: (3B) suppress any incoming call signal by the cellular phone and send a location determination command signal to the LD unit 21; (4B) receive information allowing determination of the present location and/or time of observation of the LD antenna 23 from the LD unit; (5B) cause the cellular phone 13 to transmit this present location information to a central station 37 for analysis and (optionally) further signal processing; and (6B) optionally sever the phone connection between the cellular phone 13 and the central station 37 after the present location information is received by the central station. The present location information transmitted by the cellular phone 13 can include the present location coordinates of the vehicle 11, or the unprocessed signals received by the LD unit 15 at the time the controller 17 issues the location determination command, or present location information that has been partly processed by the LD signal receiver/processor 25.

If an occupant in the vehicle 11 picks up the handset for the cellular phone 13 and attempts to make a cellular phone call, while location determination information is being received from the LD unit 15 and transmitted to the central station 37, the controller 17 will: (1) suppress transmission of the remainder of the location determination information, immediately or after a selected time delay of 0–200 msec; (2) optionally transmit a message-abort signal to the central station; (3) optionally store the remainder of the vehicle present location information in an associated memory unit; (4) allow the person with the cellular phone handset to place and conduct a normal cellular phone call; and (5A) optionally cause the cellular phone to transmit the remainder of the location determination information to the central station, after the person in the vehicle has completed that call, if the controller supplies the cellular phone network number of the central station. As an alternative to step (5A), the controller 17 may (5B) issue another location determination command to the LD unit 15 and cause the cellular phone 13 to transmit a new present location message to the central station 37, after the cellular phone handset has been replaced on its cradle.

Optionally, the controller 17 can record and store any telecommunications made by the cellular phone 13 either (1) after the LD unit 15 receives a location interrogation signal or (2) at any time, unless this recording capability is explicitly disabled (temporarily) by a disable message (confidentially held by the vehicle owner) entered into the controller. If such telecommunication is recorded, the central station 37 is optionally notified by receipt of a voice communication advisory signal from the cellular phone 13 (1) that the cellular phone has been used to communicate with a phone other than the central station phone and (2) that the phone number of this other phone and/or the voice communication itself has been recorded. The central station 37 optionally can then transmit a voice communication interrogation signal to the cellular phone 13, and a digital, analog or audio record of this recorded information can be transmitted to the central station by the cellular phone 13, after the vehicle occupant has completed the call and is no longer using the cellular phone 13. The central station 37 can transmit a voice communication interrogation signal to the cellular phone unit 13 whether or not it has received a voice communication advisory signal.

Figure 2:
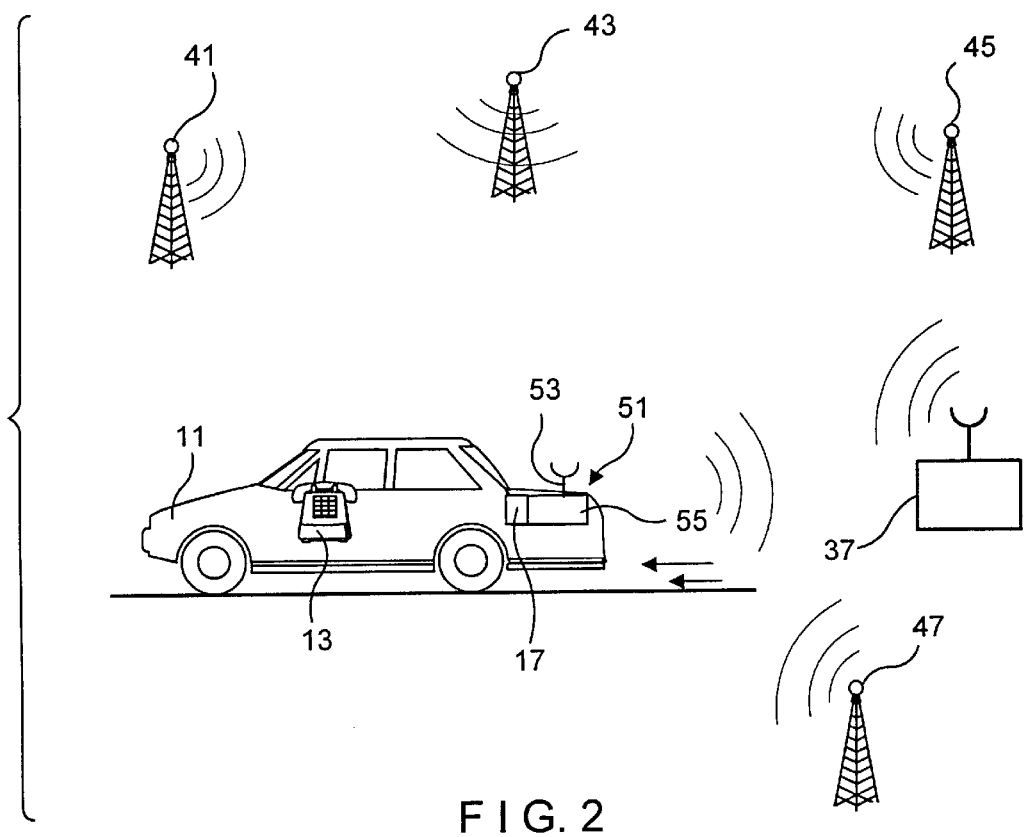
FIG. 2 is a schematic view illustrating use of one embodiment of the invention for determining the location of a land vehicle, using a ground-based LD system, such as an FM subcarrier system or a Loran system.

FIG. 2 illustrates use of the invention in a second embodiment, wherein the LD signals are provided by three or more ground-based LD signal sources 41, 43, 45, 47 and are received by an LD unit 51 that includes an LD signal antenna 53 and associated LD signal receiver/processor 55. The LD unit 51 replaces the LD unit 15 on the land vehicle 11 in FIG. 1, and the system in FIG. 2 otherwise operates as does the system in FIG. 1. The LDR unit used to practice this embodiment includes the cellular phone unit 13, the LD unit 51 and the controller 17.

FIG. 3 illustrates use of the invention in a third embodiment, wherein the LD signals 61 are provided by a plurality of satellite-based or ground-based LD signal sources (not shown) and are received by an LD unit 63 that includes an LD signal antenna 65 and associated LD signal receiver/processor 67, attached to a marine vehicle 69. The LD unit 63 in FIG. 3 replaces the LD unit 15 in FIG. 1 or the LD unit 51 in FIG. 2, and the system in FIG. 3 otherwise operates as does the system in FIG. 1 or in FIG. 2. The LDR unit used to practice this embodiment includes the cellular phone unit 13, the LD unit 63 and the controller 17.

FIG. 4 illustrates an embodiment of an LDR unit 81 that can be used to practice the invention as indicated in FIGS. 1, 2 and 3. The system 81 includes a cellular phone handset 83, radio receiver 85 and radio antenna 87. These three components may be part of a conventional cellular phone, with the other components shown in FIG. 4 being included in a retrofitted unit that is positioned between the handset 83 and the radio receiver 85. Alternatively, all components of the LDR unit 81 can be integrated in a single compact package.

The LDR unit 81 also includes an LD unit 89 that includes an LD signal antenna 91 connected to an LD signal receiver/processor 93 that is in turn connected to a cellular phone/LD unit controller 95. The controller 95 includes an LD unit controller and interface 97, connected to a cellular phone controller and interface 99, which is connected to the handset 83 for audio signal exchange and to a modem 101 for digital signal exchange. The cellular phone controller 99 and the modem 101 are each connected directly to the cellular phone radio receiver 85, to exchange audio and digital signals, respectively, with the radio. The controller 95 also includes an optional memory unit 103, for storing the remainder of an aborted location information message. The controller 95 also includes an optional voice recording and reformatting unit 105, for recording any voice communication made over the vehicle cellular phone and/or for reformatting this recorded information in a form that can be transmitted by an analog or digital communication message. Optionally, the voice recording and reformatting unit 105 can also record and reformat the telephone number of the person or facility at the other end of this voice communication, unless it is the phone number of the central station 37. A power supply 107 provides electrical power for one or more of the other components of the LDR unit 81.

In future versions of a cellular phone, the handset 83 shown in FIG. 4 may become a small, portable, personal item to be carried around by an individual user. A portable handset will require an electrical power port (unless the handset provides its own power) and a signal port to exchange audio messages, or digital or analog signals that are converted from or to audio signals within the handset itself. In this instance, a portable handset 83 would plug into the remainder of the LDR unit 81 shown in FIG. 4. This remainder of the LDR unit 81 can be provided as modules 89 and 95 retrofitted to a cellular phone radio receiver 85 and 87; or this remainder can be provided as an integrated package to which the portable handset 83 attaches. Thus, the embodiment shown in FIG. 4 will accommodate portable, carry-around cellular phone handsets as well as the familiar cellular phone handset, radio receiver, radio antenna combinations that are attached to one another.

Figure 5A:
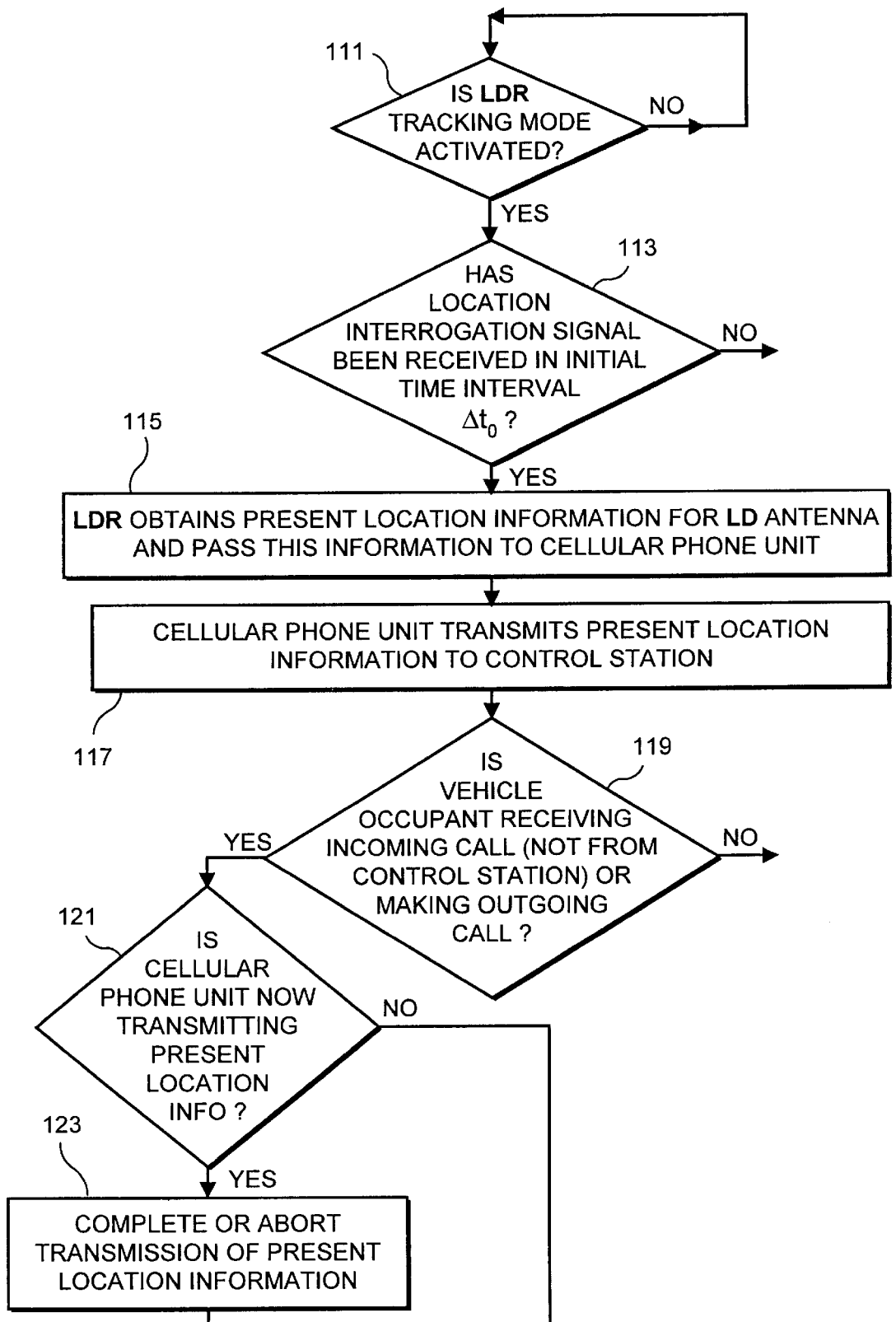

FIGS. 5A and 5B provide a flow chart illustrating a procedure that may be followed by the disclosed apparatus carried on the vehicle according to this embodiment of the invention. In step 111 in FIG. 5A, the LDR unit determines if a vehicle tracking mode is activated. If this mode is not activated, the LDR unit continues to cycle as shown. If this mode is activated, the LDR unit determines whether a location interrogation signal has been received, in step 113. If the answer is "no", the LDR unit continues to cycle as shown. If the LDR unit has received a location interrogation signal, the LDR unit obtains present location information for the LD signal antenna and passes this information to the cellular phone unit in step 115. In step 117, the cellular phone unit transmits this present location information to the central station, for analysis and/or further processing to determine the present location of the missing vehicle.

If a vehicle occupant indicates an intention to use the cellular phone unit in the vehicle, or if the cellular phone unit receives an incoming call that is not from the central station, in step 119, the LDR unit determines, in step 121, whether the cellular phone unit is presently transmitting present location information to the central station. If the answer is "no" in step 121, the cellular phone unit operates normally and allows the incoming or outgoing phone call to be completed, in step 125 of FIG. 5B.

If the answer is "yes" in step 121, the LDR unit completes this transmission (if this transmission can be completed within a selected time $\Delta t_{tr}$ of the order of 50–200 msec) or aborts this transmission of present location information by the cellular phone unit, in step 123 in FIG. 5A, allows the cellular phone unit to operate normally and allows the incoming or outgoing phone call to be completed, in step 125 of FIG. 5B. Optionally, the present location information whose transmission was aborted is stored by the LDR for subsequent transmission, in step 127. Optionally, the telephone number for the contact at the other end of the cellular phone connection for this incoming or outgoing call can be recorded, in step 129. Optionally, the voice communications made during this incoming or outgoing call can be recorded, in step 131. Optionally, in step 133, after completion of this incoming or outgoing call, the cellular phone unit can transmit a voice communications advisory signal to the central station, indicating that a voice communication and/or phone contact number has been recorded between a vehicle occupant and another person or facility has been recorded. Optionally, if the LDR unit receives a voice communication interrogation signal from the central station, this recorded information can be transmitted to the central station, in step 135.

The LD unit 15 used to determine the present location of the LD antenna 23 on the vehicle 11 may be part of a satellite-based LD system, such as the Navstar Global Positioning System (GPS), the Global Orbiting Navigational System (GLONASS), or another Satellite Positioning System (SATPS). Alternatively, the LD unit 15 may be part of a ground-based LD system, such as Loran, Omega, Decca, Tacan, JTIDS Relnav, PLRS or a similar system. Alternatively, the LD unit 15 may be part of an FM subcarrier signal system or an AM subcarrier signal system.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

An SATPS antenna receives SATPS signals from three or more (preferably four or more) SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90, which is incorporated by reference herein.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/A-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\alpha$ $f^2$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, Sep. 26, 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in the book by Logsdon, op cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k $(=0, 1, 2, \ldots, 23)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, such as is available in Differential GPS, many of the errors in the SATPS that compromise the accuracy of absolute position determination are similar in magnitude for stations that are physically close. The effect of these errors on the accuracy of differential position determination is therefore substantially reduced by a process of partial error cancellation.

Alternatively, the GPS signals may be replaced by Loran-C signals produced by three or more Loran signal sources positioned at fixed, known locations, for outside-the-building location determination, as illustrated in FIG. 2. A Loran-C system relies upon a plurality of ground-based signal towers, preferably spaced apart 100–300 km, that transmit distinguishable electromagnetic signals that are received and processed by a Loran signal antenna and Loran signal receiver/processor that are analogous to the SATPS signal antenna and receiver/processor. A representative Loran-C system is discussed in *Loran-C User Handbook,* Department of Transportation, U.S. Coast Guard, Commandant Instruction M16562.3, May 1990, which is incorporated by reference herein. Loran-C signals use carrier frequencies of the order of 100 kHz and have maximum reception distances of the order of hundreds of kilometers. The combined use of FM signals for location determination inside a building or similar structure plus Loran-C signals for location determination outside a building or similar structure can also provide a satisfactory LD system in most urban and suburban communities.

Other ground-based radiowave signal systems that are suitable for use as part of an LD system include Omega, Decca, Tacan, JTIDS Relnav (U.S. Air Force Joint Tactical Information Distribution System) and PLRS (U.S. Army Position Location and Reporting System) and are summarized by Logsdon, op cit, pp. 6–7 and 35–40, incorporated by reference herein.

In another alternative, the LD unit 51 in FIG. 2 receives FM signals from three or more FM signal sources that have locations with known location coordinates $(x_m, y_m, z_m)$ for FM signal source no. m. The FM subcarrier signal of interest may have an associated frequency of about $f_c \pm 19$ kHz, where $f_c$ is the FM carrier frequency that lies in the range 88–180 MHz. Alternatively, a higher order displacement from the carrier frequency (e.g., $f_c \pm 38$ kHz or $f_c \pm 57$ kHz) may be used. The sources of these FM subcarrier signals may be a plurality of FM broadcasting stations located in the vicinity of the vehicle 11, which may be moving or stationary. In this event, the subcarrier signals are obtained by filtering the total FM signals (carrier signal plus message signal plus subcarrier signal) to remove all but a subcarrier signal of a chosen frequency, $f_c-19$ kHz or $f_c+19$ kHz. FM subcarrier signals can be used for all monitoring of the present location of the vehicle 11, inside and outside buildings and other structures. This approach has the advantage of simplicity: only one set of radiowaves is used for location determination. FM signals are less subject to noise and other interference than are other signals, such as AM signals. Alternatively, an FM subcarrier signal can be replaced by an AM subcarrier signal (with carrier frequency $f_c=0.535–1.605$ MHz), which is obtained by filtering an AM signal at a frequency displaced from the AM carrier frequency by a relatively small amount. More generally, determination of the present location of the vehicle 11 can be made using an LD unit that receives and analyzes LD radiowave signals transmitted from one or more LD radiowave signal sources.

In this embodiment, the LD unit 51 uses three or more FM subcarrier signals emitted by three or more spaced apart FM radio stations 41, 43 and 45, positioned at known locations in the community, together with at least one additional FM source 47 that is located at a known position that is separated by a large distance from a plane defined by the locations of the other three FM station antennas. This additional FM source 47 might be located on a very tall tower, for example, relative to the heights of the transmitting antennas of the other FM radio stations 41, 43 and 45. The FM source 47: (1) receives the FM subcarrier signals transmitted by the other FM stations 41, 43 and 45; (2) determines the relative phases of these subcarrier signals at their respective sources, using the known distances of the antennas of each of the other FM stations 41, 43 and 45 from the FM source 47; (3) transmits a signal on another selected frequency that advises any FM subcarrier signal receiver of these relative phases, and (4) optionally transmits its own FM subcarrier signal, with a phase determined by an optional selected linear combination of the phases of the other three FM subcarrier signals, or determined independently of the other three phases. The vehicle 11 carries the LD unit 51 and is assigned an identifying indicium that is included in any transmission by that LD unit to the central station 37.

The LD unit 51 serves as a mobile station that receives the FM subcarrier signals and optionally transmits phase information for each of these subcarrier signals to the central station 37 for (further) processing and analysis. The central station 37 has a known location relative to each of the FM signal sources 41, 43, 45 and 47 and can determine the phase of each these FM signals relative to a selected phase reference or can determine the FM signal source phases relative to each other at a selected time. One advantage of use of FM subcarrier signals, such as $f_c \pm 19$ kHz, is that such signals are appear to be attenuated and/or distorted less, in passing through apertures in normal buildings, than are other radiowave signals. In normal circumstances, the relative phases of the FM signal sources 41, 43, 45 and 47 would not change, or would change at most a few times in any 24-hour period. However, the invention provides for the possibility that these relative phases can change often and/or quickly.

Use of an FM signal monitor, which does not otherwise participate in determination of the selected location coordinates (x,y,z), to determine the FM source phase differences is disclosed in U.S. Pat. No. 5,173,710 issued to Kelley et al, which is incorporated herein by reference. The FM source phase differences can be measured using a digital phase-locked-loop at the additional FM receiver/transmitter, as disclosed in FIGS. 4–11 and the accompanying text in the Kelley et al patent. In FIG. 2, the FM signal monitor 47 used for monitoring the source-to-source phase differences also provides one of the four FM subcarrier signals, and the phase differences of the other three FM subcarrier signals are determined relative to the phase of the FM subcarrier signal transmitted by the FM signal monitor. The location coordinates (x,y,z) of the LD unit 51 carried by the (marine) vehicle 11 are then determined.

I claim:

1. Apparatus for reporting location of a vehicle in response to receipt of a location interrogation signal, the apparatus comprising:
   a location determination (LD) unit, carried in or on a vehicle, that receives and processes LD signals to determine location coordinates for the LD unit;
   a cellular phone carried in or on the vehicle and connected to receive LD unit present location information from the LD unit; and
   a call interceptor, connected to the cellphone, that monitors for receipt of an incoming call, that receives an incoming call intended for the cellular phone, that establishes a cellular phone connection for the incoming call signal and that monitors the connection to detect presence of a location interrogation signal in the incoming call, where (1) when a location interrogation signal is detected, the call interceptor transmits the LD location coordinates over the cellular phone connection without visually or audibly indicating that an incoming call has been received and (2) when a location interrogation signal is not detected, the call interceptor provides at least one of a visually perceptible and audibly perceptible indication that the incoming call signal has been received.

2. The apparatus of claim 1, wherein:
   said cellular phone comprises a cellphone ringer that produces a visual or audible cellphone ringer signal at said cellular phone, indicating that an incoming call is being received, when said location interrogation signal is not detected; and
   said call interceptor comprises a microprocessor that is programmed as follows:
      when said incoming call is detected, production of the cellphone ringer signal is delayed for a selected time delay interval, and a radio link is established to allow receipt and transmission of telephone signals through said cellular phone;
      during the selected time delay interval, the microprocessor determines if said incoming call includes said location interrogation signal;
      when said incoming call includes said location interrogation signal, the microprocessor causes said cellular phone to obtain and transmit said LD unit present location information over said cellular phone connection without any indication that said cellular phone is active; and
      when said incoming call does not include said location interrogation signal, the cellphone ringer is produced after the selected time delay interval has ended, and said cellular phone simulates operation as a normal cellular phone in response to receipt of said incoming call.

3. The apparatus of claim 2, wherein said selected time delay interval lies in the range 1–10 sec.

4. The apparatus of claim 1, wherein said LD unit comprises an LD signal antenna and an LD receiver/processor that receive and process said LD signals to determine said present location of said LD signal unit.

5. The apparatus of claim 4, wherein said LD receiver/processor is not located on said cellular phone.

6. The apparatus of claim 4, wherein said LD receiver/processor is located on said cellular phone.

7. The apparatus of claim 1, wherein at least one of said LD unit and said call interceptor is concealed on said vehicle.

8. A method for reporting location of a vehicle in response to receipt of a location interrogation signal, the method comprising the steps of:
   receiving location determination (LD) signals at an LD unit, carried in or on a vehicle, and processing the LD signals to determine location coordinates for the LD unit;
   connecting a cellular phone, carried in or on the vehicle, to the LD unit to receive LD unit present location information from the LD unit; and
   receiving an incoming call, intended for the cellular phone, at a call interceptor that is connected to the cellular phone, that monitors for receipt of an incoming call, that receives an incoming call intended for the cellular phone, that establishes a cellular phone connection for the incoming call signal and that monitors the connection to detect presence of a location interrogation signal in the incoming call;

when a location interrogation signal is detected, causing the call interceptor to transmit the LD location coordinates over the cellular phone connection without visually or audibly indicating that an incoming call has been received; and when a location interrogation signal is not detected, causing the call interceptor to provide at least one of a visually perceptible and audibly perceptible indication that the incoming call signal has been received.

9. The method of claim 8, further comprising the steps of:

providing said cellular phone with a cellphone ringer that produces a visual or audible cellphone ringer signal that an incoming call is being received at said cellular phone; and providing said call interceptor with a microprocessor that is programmed as follows:

when said incoming call is received, production of the cellphone ringer signal is delayed for a selected time delay interval, and a radio link is established to allow receipt and transmission of telephone signals through said cellular phone;

during the selected time delay interval, the microprocessor determines if said incoming call includes said location interrogation signal;

when said incoming call includes said location interrogation signal, the microprocessor causes said cellphone to obtain and transmit said LD unit present location information over said cellular phone connection without any indication that said cellphone is active; and when said incoming call does not include said location interrogation signal, the cellphone ringer is produced after the selected time delay interval has ended, and said cellular phone simulates operation as a normal cellular phone in response to receipt of said incoming call.

10. The method of claim 9, further comprising the step of choosing said selected time delay interval to lie in the range 1–10 sec.

11. The method of claim 8, further comprising the step of providing said LD unit with an LD signal antenna and an LD receiver/processor that receive and process said LD signals to determine the present location of the LD signal antenna.

12. The method of claim 11, further comprising the step of locating said LD receiver/processor on said cellular phone.

13. The method of claim 11, further comprising the step of not locating said LD receiver/processor on said cellular phone.

14. The method of claim 8, further comprising the step of concealing at least one of said LD unit and said call interceptor on said vehicle.

* * * * *